United States Patent [19]

Thijssen

[11] Patent Number: 4,762,622
[45] Date of Patent: Aug. 9, 1988

[54] APPARATUS AND PROCESS FOR SEPARATING SOLID PARTICLES FROM A LIQUID SUSPENSION AND/OR FOR THE PURIFICATION OR LEACHING OF SOLID PARTICLES

[75] Inventor: Henricus A. C. Thijssen, Son, Netherlands

[73] Assignee: Grasso's Koninklijke Machinefabrieken N.V., s-Hertogenbosch, Netherlands

[21] Appl. No.: 83,284

[22] Filed: Aug. 10, 1987

Related U.S. Application Data

[62] Division of Ser. No. 829,163, Feb. 14, 1986, Pat. No. 4,705,624.

[30] Foreign Application Priority Data

Feb. 15, 1985 [EP] European Pat. Off. ........ 85200193.2

[51] Int. Cl.⁴ .................... E01D 29/04; E01D 35/00
[52] U.S. Cl. ................................. 210/737; 62/532; 210/774; 210/785; 210/808

[58] Field of Search .................. 422/245, 251–254; 210/175, 774, 178, 179, 808, 413, 408, 96.1, 97, 416.1, 194, 195.1, 195.3, 196, 197, 702, 184, 709, 737, 785; 62/132, 177, 543, 135, 190, 544, 137, 532, 440, 139, 533, 537–542

[56] References Cited

U.S. PATENT DOCUMENTS

2,910,516 10/1959 Rush .................................... 210/179
3,070,969 12/1962 Ashley et al. ........................ 62/537
3,872,009 3/1975 Thijssen ............................. 210/179

Primary Examiner—Frank Sever
Attorney, Agent, or Firm—Fleit, Jacobson, Cohn & Price

[57] ABSTRACT

The process for separating the solid particles in the column is based on the intermittent supply of pressurized suspension to the apparatus which pressure supplies the energy required for feeding the suspension near one end into the column, the squeezing of the suspension liquid out of the suspension under withdrawal of the suspension liquid from the column near that same end of the column, the compaction of the solid particles, the transport of the compacted bed of particles towards the opposite end of the column and the washing of the compacted bed with wash liquid, the bed is mechanically disintegrated, the product of this disintegration is removed in suspended form while maintaining a wash front separating the non washed and washed parts in the compacted bed.

2 Claims, 5 Drawing Sheets

FIG. 8

APPARATUS AND PROCESS FOR SEPARATING SOLID PARTICLES FROM A LIQUID SUSPENSION AND/OR FOR THE PURIFICATION OR LEACHING OF SOLID PARTICLES

This is a divisional of application Ser. No. 829,163, filed Feb. 14, 1986, now U.S. Pat. No. 4,705,624.

The invention relates to an apparatus and a process for separating solid particles from a liquid suspension and/or for the purification or leaching of solid particles.

A method for separating crystals from a suspension and washing the crystals with a wash liquid, in a continuous packed bed wash column is described in the British patent application GB No. 2,023,564. Mechanical means are used to move continuously the bed of crystals in counter currence with the wash liquid. This may be accomplished by applying rotating tilted hollow vanes attached to a shaft. These vanes are provided with a screen. The aqueous solution is withdrawn through the hollow screened vanes. Disintegration of the bed of crystals is accomplished by melting or by using scrapers.

This apparatus is not suitable for separating soft crystals, like fats and fatty acids from their mother liquid because the action of the rotating vanes results in a destruction of the crystals.

This drawback is not encountered in the apparatus and process described by the U.S. Pat. No. 3,872,009, in which the suspension is batch-wise introduced. The column consists of a cylinder closed at one end by a piston. This piston is used to compact the solid particles and to squeeze the suspension liquid out of the suspension. During that compaction stroke the suspension is pressed against a surface near one of the ends of the column, which end is provided with a screen through which suspension liquid is withdrawn. In the next phase the compacted solid particles are displaced in the direction of the other ends of the cylinder. During the last mentioned phase the compacted bed is disintegrated by melting or scraping. During the subsequent suction stroke the piston is released from the compacted bed and fresh suspension is drawn into the space between the surface provided with the screen and the compacted bed.

A drawback of this batch-wise acting wash-column is the complicated construction of the reciprocating piston and its limitation with regard to scaling up to column diameters above e.g. 50 cm.

As a result of extensive research and experimentation an improved column, a complete equipment of which such column forms an essential part, as well as a method for separating solid particles from a liquid suspension and/or purification or leaching out of solid particles in a column, are provided in order to avoid the before depicted disadvantages of the equipment presently available according to the state of the art.

Therefore the present invention is relating to an improved column for separating solid particles from a liquid suspension and/or purification or leaching of solid particles, consisting of a cylindrical column closed at both ends by a fixed wall or a lid, provided near one end with a rotating scraper for the disintegration of a washed compacted bed, means for supplying wash liquid and means for removing suspended solid particles, and near the opposite end of the column provided with a non movable screening device for supplying pressurized liquid suspension, the withdrawal of liquid from the suspension out of the column and the transport of the compacted bed of solids, which screening device consists of two parallel circular plates, mounted perpendicular to the axis of the column and having diameters equal to the inner diameter of the column of which part of the plate facing the scraper is permeable for liquid and not permeable for the suspended solids, where the other part of that plate contains channels which extend into the other parallel plate, which channels are the inlet ducts supplying suspension, have no open connections to the space enclosed by the two parallel plates and which channels have a diameter which is at least one order larger than the diameter of the perforations in the plate facing the scraper.

In this column the liquid suspension is expelled via a screening device situated in the column. The pulsewise moving compacted bed is disintegrated and the product of this disintegration is removed.

From a viewpoint of construction costs, a preferred embodiment of such a column is characterized in that the other parallel plate of the screening device not facing the scraper is not identical with the fixed wall closing the cylinder, and the channels connect the spaces at both sides exterior to the parallel plates and the space between the other parallel plate and the wall closing that end of the cylinder comprises a means for supplying the liquid suspension.

However even attractive results can be obtained with an alternative embodiment of a column, characterized in that the other parallel plate of the screening device not facing the scraper, is formed by the fixed wall closing of that end of the cylinder.

The present invention will now be further described with reference to the accompanying Figures.

In columns for the separation and/or purification of solid particles from a suspension in which liquid suspension is fed pulsewise, the compacted bed must be released from the screening plate at the beginning of the feeding phase.

It will be appreciated by people skilled in the art that an advantage of the equipment and process of the present invention is relating to the feature, that all actions within the wash column are controlled by the pressure $P_1$ by means of which an automatical adjustment is reached under differing process conditions.

Figure 2:
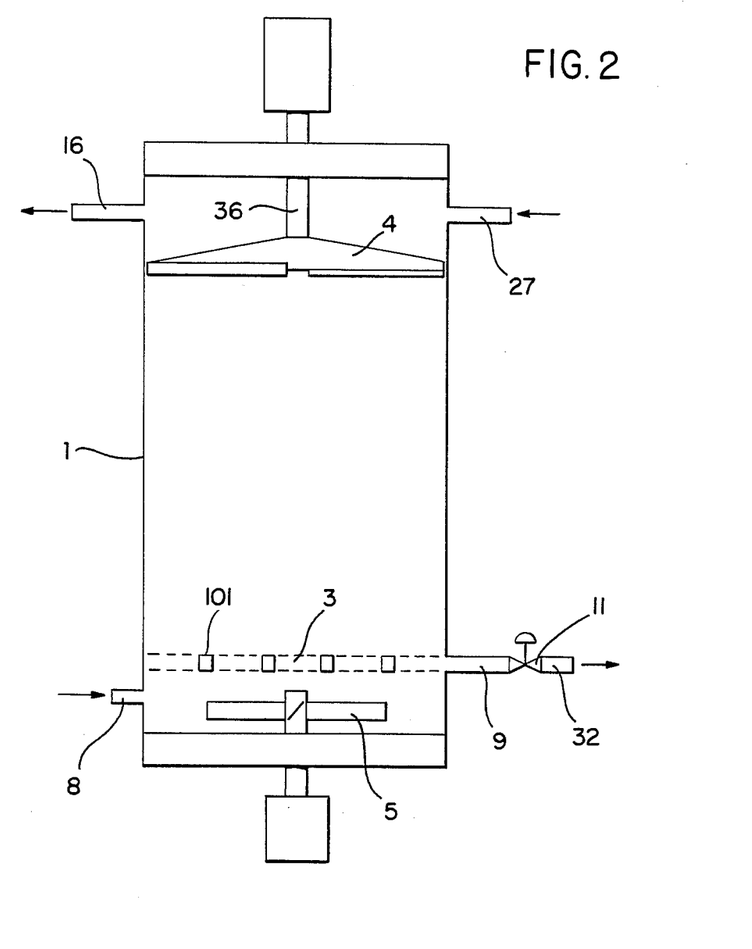
FIG. 2 schematically shows a possible embodiment of the wash column including a screening device.
Figure 3:
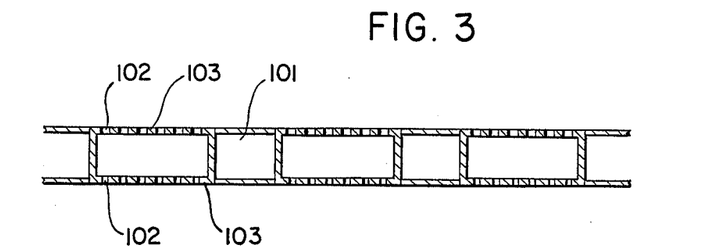
In FIGS. 3-6 some possible embodiments of the screening device are shown in schematical form.
Figure 4:
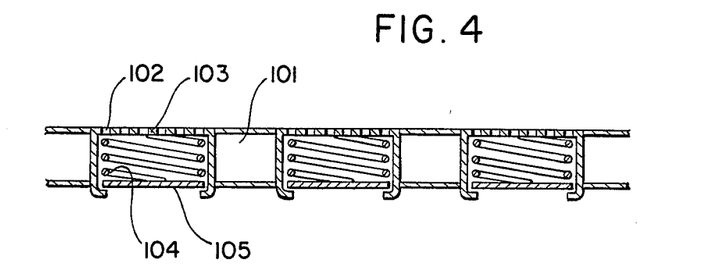
Figure 5:
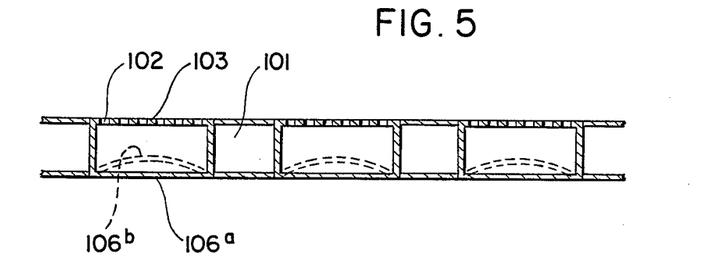

According to one of the specific embodiments of the wash column of the invention as depicted in FIG. 2, this column is improved by providing it with a screening device 3 consisting of two parallel plates 103 which plates are situated between the compacted bed and the suspension inlet (FIG. 3-5).

Channels 101 between these plates connect the spaces on either side of the screening device. The channels have a diameter large enough to let the suspension pass. These channels do not have open connections with the space enclosed by the screening plates. The channels are preferably formed by hollow cylinders perpendicular to the screening plates. The diameter of the perforations 102 and/or the surface fraction of the perforations of the screening plate next to the suspension inlet has to be substantially smaller than the diameter of the perforations and/or the surface fraction of the perforations of the other opposite screening plate. The diameter of the perforations must be small enough to prevent that solid particles are pushed through these perforations. The friction of the suspension through the channels must be much smaller than the friction of the liquid phase through the two screening plates. The diameter of the channels is preferably between 0.2 and 10 cm, depending on the kind of liquid suspension. For example in the case of aqueous suspension the diameter of the channels is preferably between 0.5 and 3 cm.

At the beginning of the feeding phase the compacted bed rests on the screening device. When liquid suspension is fed, the liquid phase presses equally against the whole surface area of the compacted bed as a result of the permeability of the screening plates. The bed is uniformly and simultaneously released from the screening plate. Subsequently the supplied liquid suspension flows through the channels 101 between the screening plates into the space between the compacted bed and the screening device, meanwhile lifting this bed.

In an alternative embodiment the screening device is provided with a screening plate 103 at the side of the compacted bed, while on the opposite side the screening device is closed by a plate 105 without perforations, which is movable in the direction of the opposite plate. At the beginning of the feeding phase the liquid suspension presses against plate 105. By the resulting movement of the plate the liquid phase is pressed out of the screening device via perforations 102, releasing the compacted bed from the screening device. The movable plate 105 returns to its original position when the pressure drop over the screening device decreases, for example by its own weight or by means of springs 104.

In a second alternative embodiment the screening device is provided with a screening plate 103 at the side of the compacted bed, while on the opposite side the screening device is provided with an flexible membrane 106 which is not permeable for liquid. By supplying liquid suspension the membrane is moved from position 106a under influence of the pressure drop to position 106b. The liquid phase is pressed out through the perforations 102, releasing the compacted bed from the screening device. After the pressure drop over the screening device is vanished, the membrane returns in position 106a.

The liquid phase separated from the solid particles is drained off from the space between the screening plates.

Figure 6:
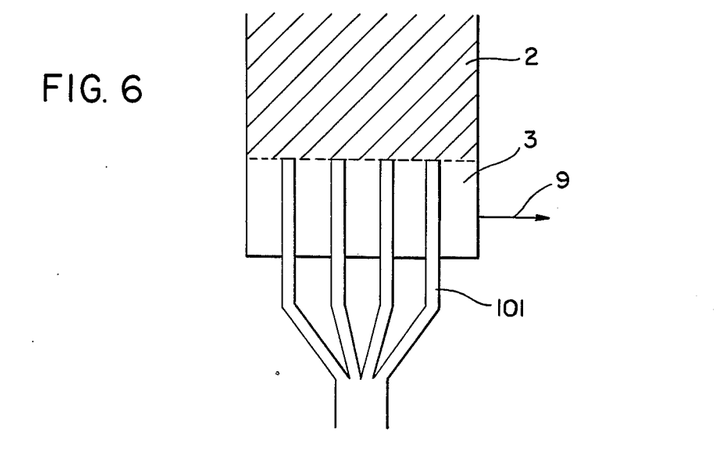

It will be appreciated that according to an additional alternative embodiment of the present invention a screening device according to FIG. 6 is included in the wash column. Such a screening device is essentially consisting of one screening plate, while the supply of liquid suspension from a central feed pipe actually takes place through a plurality of channels, emanating from a central feed pipe.

Upscaling to any other industrial-useful scale will smoothly proceed because no movable parts in the column are embodied which have to supply the force necessary to transfer the compacted bed 2 and the suspension. In an embodiment of the invention which will be described by means of the FIG. 1 unless indicated otherwise, the driving force is supplied by an external pump 13. Also the use of the screening device 3 excludes difficulties in upscaling. The pump 13 is admittently or continuously pumping to maintain increased mean pressures $P_1$ and $P_2$ where automatically $P_2$ will remain smaller than $P_1$.

Figure 1:
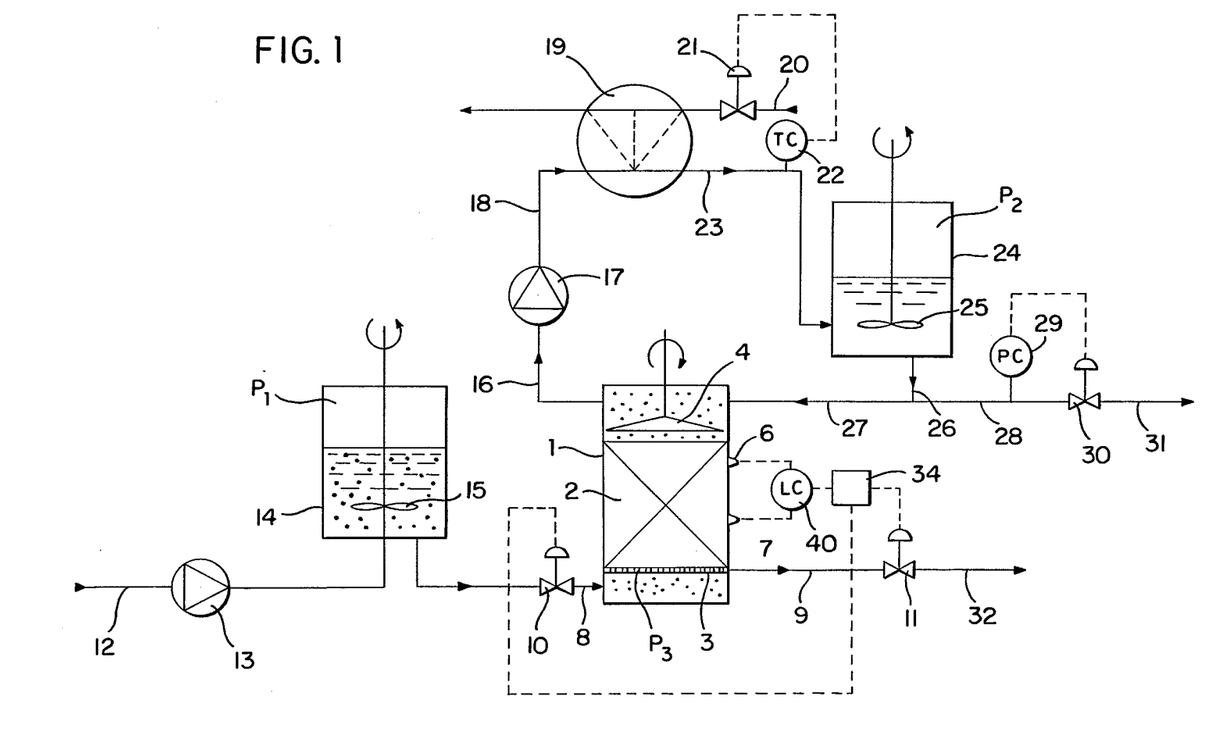
FIGS. 1, 7 and 8 schematically show a possible embodiment of the equipment to be used for carrying out the process of the present invention and of which the wash column is forming an essential part.

The wash column is used pulse wise. The cycle in the process of the present invention can be devided in two phases, viz. a feeding phase and a compacting/washing phase. The feeding phase, succeeding the washing phase, starts when a signal of detector 7 is obtained indicating that the wash front in the compacted bed, the dividing plane between the liquid solution and the wash liquid, has reached the first outmost limit at detector 7. In one embodiment sensing devices, in themselves known, record the concentration difference that exists between the liquid solution and the wash liquid (for example photo-electric cells). In another embodiment sensing devices, known per se, record the temperature difference that exists between the liquid solution and the wash liquid (for example thermocouples or infrared detectors). The signal is processed by a level controller 40.

After said signal of detector 7, valve 11 is closed and shortly later valve 10 is opened. Between the valve 11 is closed and the valve 10 is opened, a time delay may be introduced by a timer 34. Because of the pressure difference between the pressure $P_1$ in expansion vessel 14 and the pressure $P_2$ in expansion vessel 24, the suspension is fed into wash column 1 via feed line 8 and the compacted bed is lifted. Because of this pressure difference the compacted bed is pushed against the rotating scraper 4 (for example a disk provided with knives), by which the upper layer of the washed compacted bed is disintegrated. Because of this pressure difference over the compacted bed the liquid solution is transported in respect of the compacted bed in the direction of the scraper, so the washfront is moving somewhat faster than the compacted bed in the direction of the scraper.

At the beginning of the feeding phase pressure $P_2$ in expansion vessel 24 has reached its lowest value during the whole cycle and valve 30 is closed. During the feeding phase pressure $P_2$ is increased up to a chosen maximal value of pressure $P_2$, then pressure controller 29 actuates valve 30 and the pressure $P_2$ remains constant at the chosen maximal value. The actuation of valve 30 is also possible by a level controller of the liquid in expansion vessel 24, using the relation between pressure $P_2$ and the gas volume above the liquid in expansion vessel 24.

The feeding phase in ended and the compacting/washing phase is started when detector 6 gives a signal to the level controller 40 that the washfront has reached the second outmost limit. At the beginning of the compacting/washing phase value 10 is closed and valve 11 is opened. Between the time valve 10 is closed and valve 11 is opened, a time delay may be introduced by timer 34. The driving force, responsible for the transport of the liquid phase through the screening plates out of the column and for the movement of the washfront in the direction of the screening device during the compacting/washing phase, depends on the difference between the values of pressures $P_2$ and $P_3$.

In consequence of this difference in pressure between $P_2$ and $P_3$, $P_3$ is the pressure in the outlet of the screening device, the liquid phase is transported through the screening plate, while the solid particles remain behind and are pressed together as a compact layer. Already during this compacting, but especially afterwards, the washfront moves as a result of the pressure drop over the compacted bed, in the direction of the screening device until the level is reached where detector 7 is situated. Detector 7 gives the signal that the washfront has reached the first outmost limit and the cycle starts again. This cycle of the washfront takes about 0.1 to 40 seconds.

A part of the compacted bed from the side which is situated opposite to the side which joins the screening device has to be removed during the cycle in order to prevent unlimited expansion of the compacted bed. According to the invention the column is provided with a scraper 4 (for example a radial rotating disk provided with knives). Several scrapers suitable for such a purpose can have several forms, as known in the art. The scraper disintegrates that part of the washed compacted bed which is pushed against this scraper. The scraped product, solid particles created by disintegration, is flushed out by wash liquid. This suspension is melted in heat exchanger 19 and the formed clean liquid is pumped around by pump 17 at a pressure $P_2$ and can be recycled as wash liquid.

By means of a temperature sensor 22 the heat supply, supplied by heat exchanger 19, is controlled for example by valve 21 in heating liquid supply line 20 and a temperature is adjusted for the wash liquid, which is for example maximally 3° C. warmer than the melting temperature of the washed solids obtained in column 1. For example using water as wash liquid the temperature is maximally 1° C. above the melting point of the ice crystals supplied by column 1.

In the last part of the feeding phase, when pressure $P_2$ has reached its maximal value, a part of the recycled wash liquid is drained off by valve 30.

In one embodiment of the invention the radial rotating scraper is movable in axial direction. The scraper is situated above the compacted bed and its weight pushes on the compacted bed. The setting force of the knives of the scraper is supplied by the weight of the scraper. In general the scraper is preferably movable in the direction of the axis of the cylindrical column to give a pressure on the knives to disintegrate the washed compacted bed in an optimal way.

In an alternative embodiment the scraper is not movable in axial direction and has a relatively high scraping capacity. During the feeding phase the compacted bed is pushed against the scraper as a result of the pressure difference over the compacted bed. The scraping will continue to at the end of the feeding phase.

To keep the solid particles near the inlet of the screening device in suspension, a stirrer 5 can be mounted. Stirrers 15 and 25 may also be mounted in the expansion vessels 14 and 24, respectively.

Figure 7:
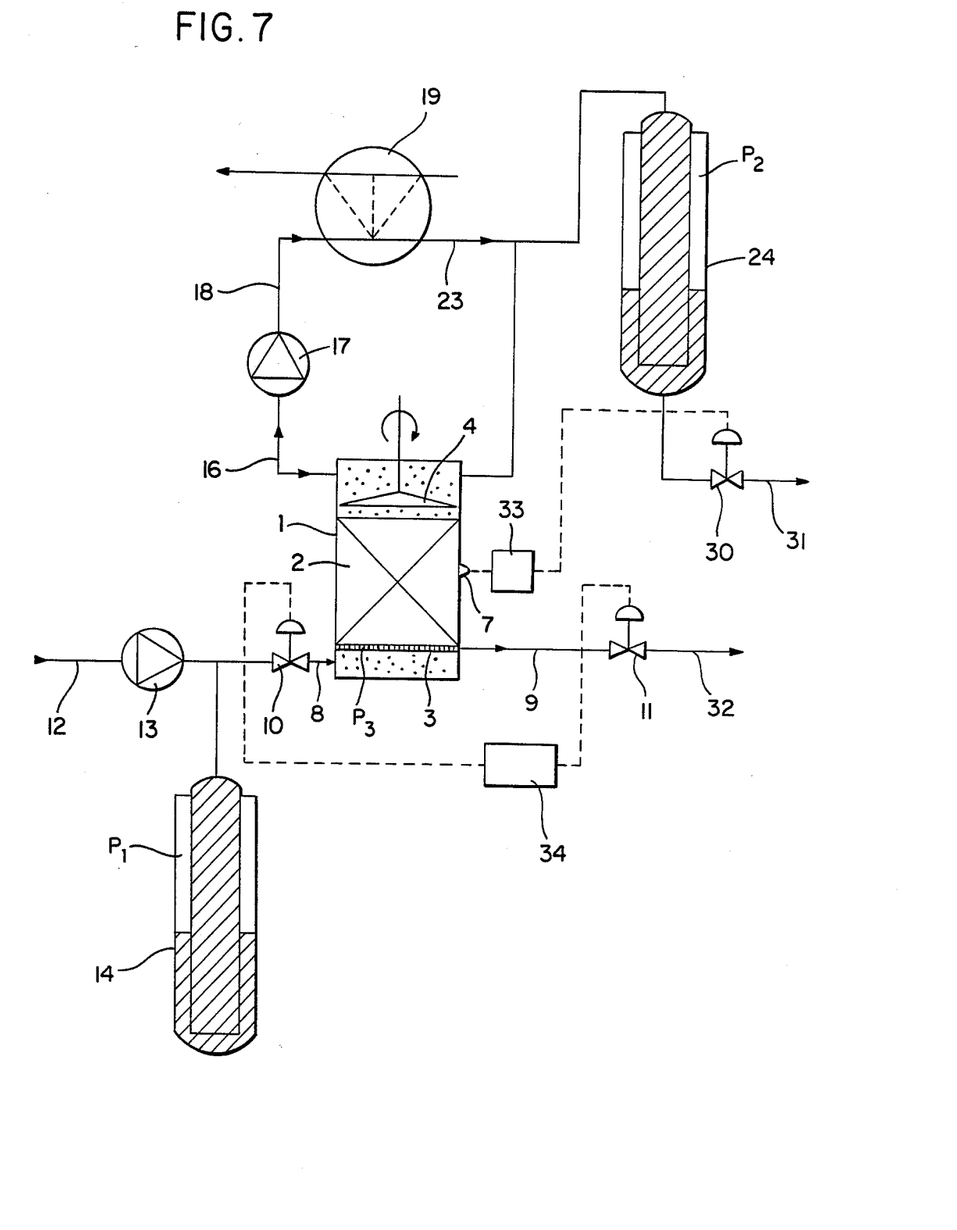

FIG. 7 shows a somewhat alternative arrangement according to the invention different from that presented by FIG. 1. The buffers indicated by 14 and 24 consist of two coaxial cylinders of which the inner one at the end extending into the outer cylinder is open, and the outer one is closed at both ends. The annulus remains partly filled with gas. The suspension is fed into the top of the vertically placed inner cylinder during compression, and leaves that top during expansion.

In case of the ice crystals suspended in an aqueous solution, the crystals tend to float in the upper part of the inner cylinder. During the compression of the gas phase the entering suspension fluidizes the floating crystals, and during the expansion phase the suspended crystals are preferentially removed.

With this arrangement suspensions in liquid of which the density of the suspended particles is lower than the liquid density, can be ideally buffered and do not require stirring.

Also the process control according to FIG. 7 is principally different from that according to FIG. 1. The column contains only one sensor 7, which indicates whether the wash front is above or below the position of the sensor. In case the wash front passes below the level of the sensor, meaning that, due to a too high pressure $P_2$, the wash front is pushed away from the scraper, the signal of the sensor starts to open valve 30. The increased flow of melted crystals leaving via 31 results in a gradual decrease of the pressure $P_2$. As soon as the wash front rises above the sensor, valve 30 is closed, resulting in an increase of pressure $P_2$. The feeding of suspension to the column and the withdrawal of liquid is controlled by the valves 10 and 11 respectively, which in turn are actuated by a timer 34. Practical sequences for valve 10 are for example: periods of from 0.05–9 seconds and preferably 0.5 seconds open while valve 11 is closed, followed by a dead time interval of from 0.05–0.5 and preferably 0.1 seconds during which both valves 10 and 11 remain closed, succeeded by a period of from 0.05–30 seconds preferably of 2 seconds that only valve 11 is open; again a dead time interval of between 0.05–0.5 and preferably of 0.1 seconds, after which the cycle is repeated. During the interval that valve 10 is in open position, the suspension is fed to the column, passes through the channel 101 (see FIG. 2) and lifts the compacted bed of crystals 2. When the valve 10 is closed and valve 11 in open position, the positive pressure difference $P_2-P_3$ expels liquid from the freshly introduced suspension in the wash front via the inner sieve surface 103 to the liquid outlet 32. Subsequently the wash front moves towards the screening device until sensor 7 actuates valve 30 which then starts to open, thus bringing the moving wash front to a standstill. The wash pressure $P_2$ is not adjustable independently but wholly determined by feeding capacity and concentration of suspended solids in the feed and the suspended particle size and shape distribution.

It will be appreciated that the wash columns according to the present invention will operate in the described advantageous way with a varying height of the column between 10 and 200 cm. Preferred heights of these columns are lying between 25 and 100 cm for most practical conditions. The diameter of the column may vary from 10–100 cm and preferably from 15–25 cm.

The wash column will preferably be used in a vertical state, i.e. in the direction of the axis. However, good operation can be reached in both the situations that the scraper is in the top of the cylinder or in the bottom of the cylinder.

The wash column of the present invention may give attractive results for the concentration of aqueous solutions and separation of ice crystals. However, other two phase (liquid/solid) systems like e.g. fatty acids, paraxylene in liquid and solid form may be treated with the same results.

The invention is illustrated by the following examples, however without a restriction of the scope of the invention to these embodiments.

EXAMPLE 1

Ice crystals are formed in a directly cooled crystallizer which is continuously fed with a sucrose solution of 1 wt% in water and in which crystallizer that solution is concentrated upto 8 wt% dissolved sucrose. The direct cooling is obtained by injection of liquid butane in the stirred aqueous solution. The solution is kept at an absolute pressure of 0.95 bar. At a residence time of the crystals of 25 minutes the mean particle diameter of the ice crystals is 250 μm. That crystal suspension containing 20 wt% crystals is continuously fed to wash column 1, according to FIG. 7. The feeding rate of the suspension is 650 kg/h and the corresponding ice feed rate 130 kg/h.

The wash column 1 has an inner diameter of 15 cm and a total length of 100 cm. The rotating scraper 4 is movable in axial direction of the column over a length of 5 cm. By means of a pneumatic system it presses with an overpressure of 0.4 bar against the vibrating compacted ice crystal bed 2. The minimum distance between the scraper and the screening device is 75 cm. The screening device consists of two parallel sieve plates, which are connected by pipes having an inner diameter of 1.0 cm and are situated in a triangle arrangement at a mutual distance of 3.0 cm. The holes in the sieve plates facing the compacted bed of crystals are 100 μm and the free surface area is 10%. The holes in the other sieve plates are 50 μm and the free surface area is only 1%. The sensor 7 is a photocell. The opening and closing periods of the ball valves 10 and 11 in the suspension inlet 8 and the liquid outlet 9 are controlled by the cycle timer 34. In the present example the periods are: valve 10, 1 second in open position followed by a dead time of 0.1 seconds that both valves are closed, subsequently followed by valve 11 during 2 seconds in open position and thereupon again a dead time interval of 0.1 seconds that both valves are closed again. After this last interval the cycle is repeated.

Under the conditions mentioned the mean pressure $P_1$ is about 2 bars overpressure, the exit pressure for the liquid leaving the screening device 3 via 9, valve 11 and 32 is atmospheric and the mean pressure $P_2$ of the liquid above the scraper is about 0.5 bars overpressure.

During the feeding phase the compacted ice bed is lifted from the screening device by about 3.3 cm. The wash front is lifted by about 3.5 cm. The lifting of the compacted ice crystal bed occurs absolutely evenly and the interface separating the compacted bed from the freshly introduced crystal suspension remains parallel with the surface of the screening device. At the feed rate of 130 kg ice crystals per hour, which is equivalent to a capacity of 7357 kg ice/m² column cross section per hour, a very stable and horizontal wash front is obtained. The sucrose concentration in the melt of the washed ice crystals leaving the column at 31 amounts to about 10 ppm. The mother liquid leaves the column at 32 at a concentration of 8 wt%.

EXAMPLE 2

About the same wash column as described in Example 1 is used for the separation and purification of para-xylene crystals out of a suspension of those crystals in a mother liquid containing the isomers of para-xylene and ethyl benzene. Differences with the wash column according to Example 1 are: (1) the scraper is not movable in the axial direction of the wash column and rotates at a higher speed and (2) other configurations of the buffer vessels 14 and 24. For the buffering of the suspension of para-xylene crystals the inner cylinders are removed and the joined inlet and outlet is at the bottomside of the cyclindrical buffer vessel. The crystal suspension leaving the crystallizer at a temperature of 0° C. contains 25 wt% para-xylene crystals, the concentration of para-xylene dissolved in the mother liquid amounts 69 wt%.

The mean particle size of the crystals is 160 μm. The feed rate of the suspension to the wash column is 500 kg/h and the corresponding para-xylene crystal feed rate 125 kg/h. The cycle sequence is: valve 10, 2 seconds in open position followed by a dead time of 0.1 seconds, than both valves 10 and 11 are closed, subsequently followed by valve 11 during 2 seconds in open position and thereupon again a dead time interval of 0.1 seconds that both valves are closed again.

Under the conditions mentioned the mean pressure $P_1$ is about 4 bar overpressure, the exit pressure for the liquid leaving the screen device via 9, valve 11 and 32 is atmospheric and the mean pressure $P_2$ of the liquid above the scraper is about 3.0 bar overpressure. The washfront separating in the compacted crystal bed the zone where the interstices are still filled with mother liquid of 0° C. and the zone where the mother liquid has been replaced by the melt of pure para-xylene crystals of 13° C. is kept somewhere in the middle of the column. The purity of the melt leaving the column at 31 amounts 99.98 wt%.

EXAMPLE 3

The wash column according to the invention is used to purify sodium chloride from its adhering mother liquid. The suspension of mother liquid and crystals contains at a temperature of 60° C., 29 wt% crystals. The mother liquid contains 38 wt% dissolved sodium chloride, 58 wt% water and 4 wt% dissolved impurities like sodium sulphate. The mean crystal diameter is defined by:

$$\frac{1}{d} = \Sigma \frac{x_i}{d_i}$$

in which $x_i$ is the weight fraction of the crystals with diameter $d_i$. The mean crystal diameter is 195 μm.

In the wash column the crystals are separated from their mother liquid and subsequently countercurrently washed with the saturated solution of pure sodium chloride crystals in demineralized water. The example will be elucidated with aid of FIG. 8. The wash column 1 is a cylinder with a total length of 100 cm and an inner diameter of 15 cm. The rotating scraper 4 is movable in the axial direction of the column over a length of 6 cm. By means of a pneumatic system it presses with a pressure of 0.05 bar against the vibrating compacted bed of sodium crystals 2. The minimum distance between the scraper and the screening device 103 is 74 cm. The screening device consists of two parallel sieve plates, which are connected by pipes having an inner diameter of 1.0 cm and are situated in a triangle arrangement at a mutual distance of 3 cm. The holes in the sieve plates facing the compacted bed are 150 μm and the open surface area occupied by the holes is 10%. The holes in the other sieve plates are also 150 μm but the open surface area is only 1%. The wash column is mounted vertically with the screening device in the upper part of the column. The vessels 71 and 85 are buffer vessels. 80 is an open storage vessel supplied with a liquid level indicator 82. The crystals are separated from the saturated solution of pure sodium chloride crystals in pure water in the decanter centrifuge 74 which contains a helical conveyor.

Figure 8:
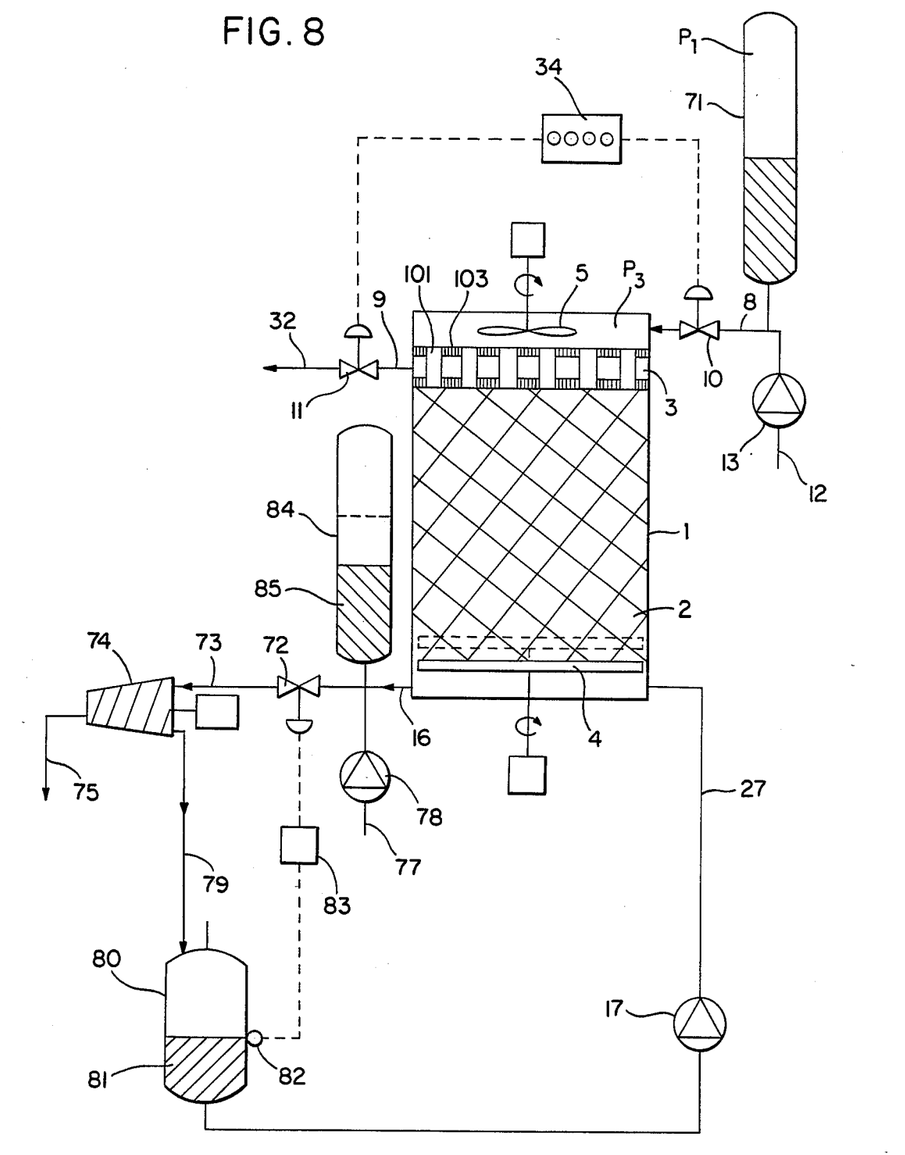

The suspension of sodium chloride crystals in mother liquid is continuously fed to the column with pump 13 at a rate of 850 kg/h. The opening and closing periods of the ball valves 10 and 11 in the suspension inlet 8 and the liquid outlet 9 are controlled by the cycle timer 34. In the present example the periods are: valve 10, 0.5 seconds in open position followed by a dead time of 0.1 seconds that both valves are closed, subsequently followed by an open position of valve 11 during 2 seconds and thereupon again a dead time interval of 0.1 seconds that both valves are closed. After this last interval the cycle is repeated. The washed and purified crystals are scraped from the compacted bed with scraper 4 and suspended in the recirculating saturated solution introduced via 27 and leaving the column via 16. Between 16 and 73 a pilot valve is installed which is controlled by the leval indicator 82 in the open buffer vessel 80. If the level of the liquid 81 in vessel 80 becomes lower than the desired value, valve 72 is further opened and when the liquid level raises above the desired level, valve 72 is further closed. Pure demineralized water is introduced in the system via 77 and dosing pump 78 into 16 and subsequently 73. The crystals are separated from the saturated solution with the aid of decanter centrifuge 74. The slightly wet purified crystals leave the centrifuge via 75. The saturated liquid is recirculated via buffer vessel 80, pump 17 and 27 to the bottom end of the wash column. Dosing pump 78 is adjusted such that the reflux of liquid in the compacted bed 2 amounts 1% of the flow of crystals on dry basis. In the present example this is per hour 0.01*0.29*850 is 2.5 kg water saturated with sodium chloride. The impurities of the wet crystals leaving the decanter centrifuge at 75 amounts to less than 0.01 wt%.

What is claimed is:
1. A process comprising separating solid particles from a liquid suspension and/or purification or leaching of solid particles in a column based on the pulsating movement of a compacted bed in this column to which a liquid suspension, under withdrawal of liquid phase, by supplying pulsewise at one end of the column and disintegrating the washed compacted bed removing the product of this disintegration at the opposite end of the column, moving the washfront in the compacted bed between two outermost limits in the compacted bed, supplying the energy for the compacting and filtering of the suspension, the transport of the compacted bed to the scraper and the washing by the feeding pump 13, while operating the wash column at pressures $P_2$ and $P_3$ determined by permeability and length of the compacted bed, the feed rate of the suspension, the fraction of suspended solids in the feed, the wall friction and the pressure of the scraper against the bed.
2. A process according to claim 1 characterized in that a total cycle of the feeding and washing amounts between 0.1 and 40 seconds.

* * * * *